Nov. 21, 1950          J. L. EVANS ET AL          2,530,866
                    TRANSPORTATION ASSEMBLY
Filed Nov. 26, 1946                          5 Sheets-Sheet 2
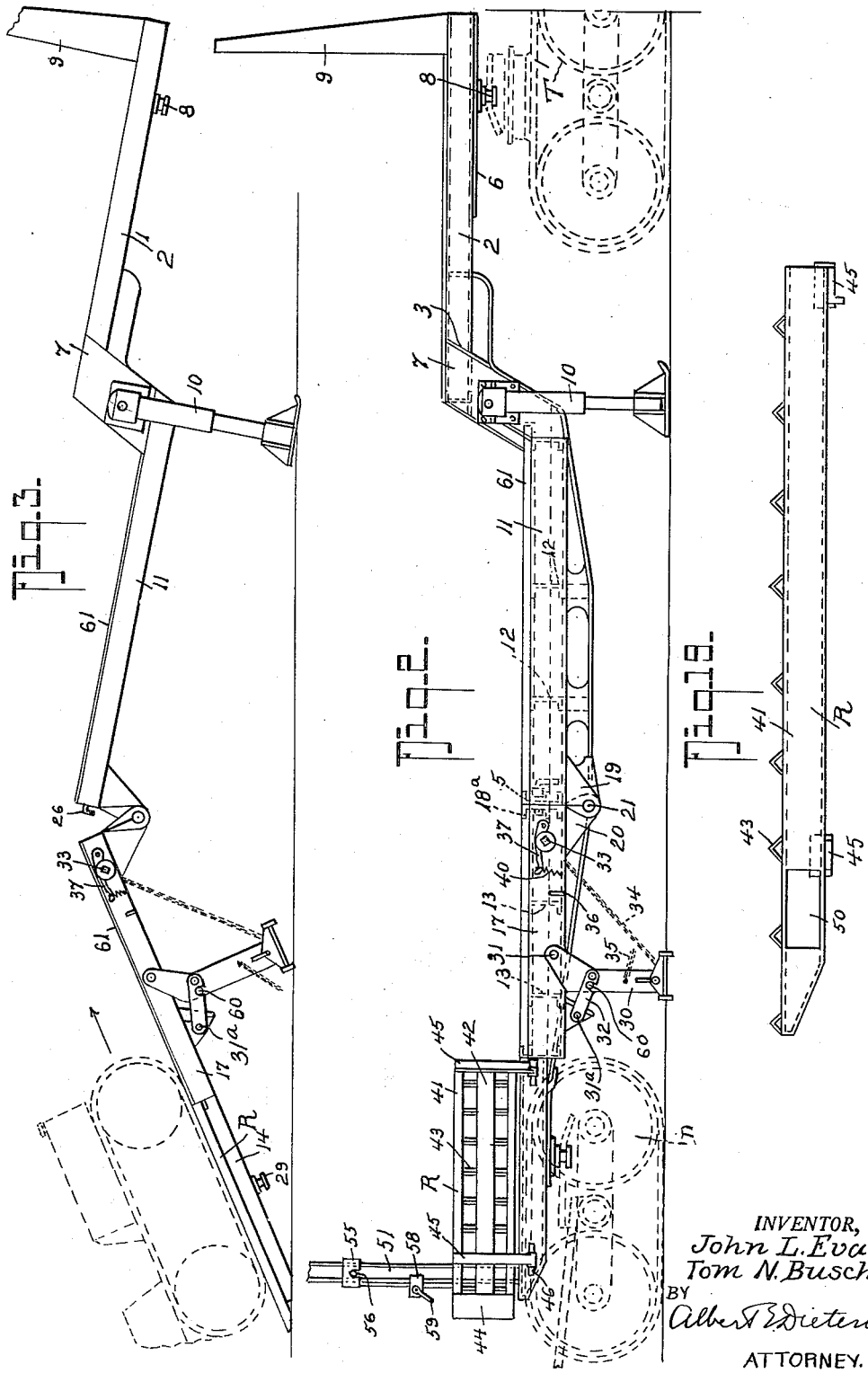
INVENTOR,
John L. Evans,
Tom N. Busch,
BY Albert E. Dieterich,
ATTORNEY.

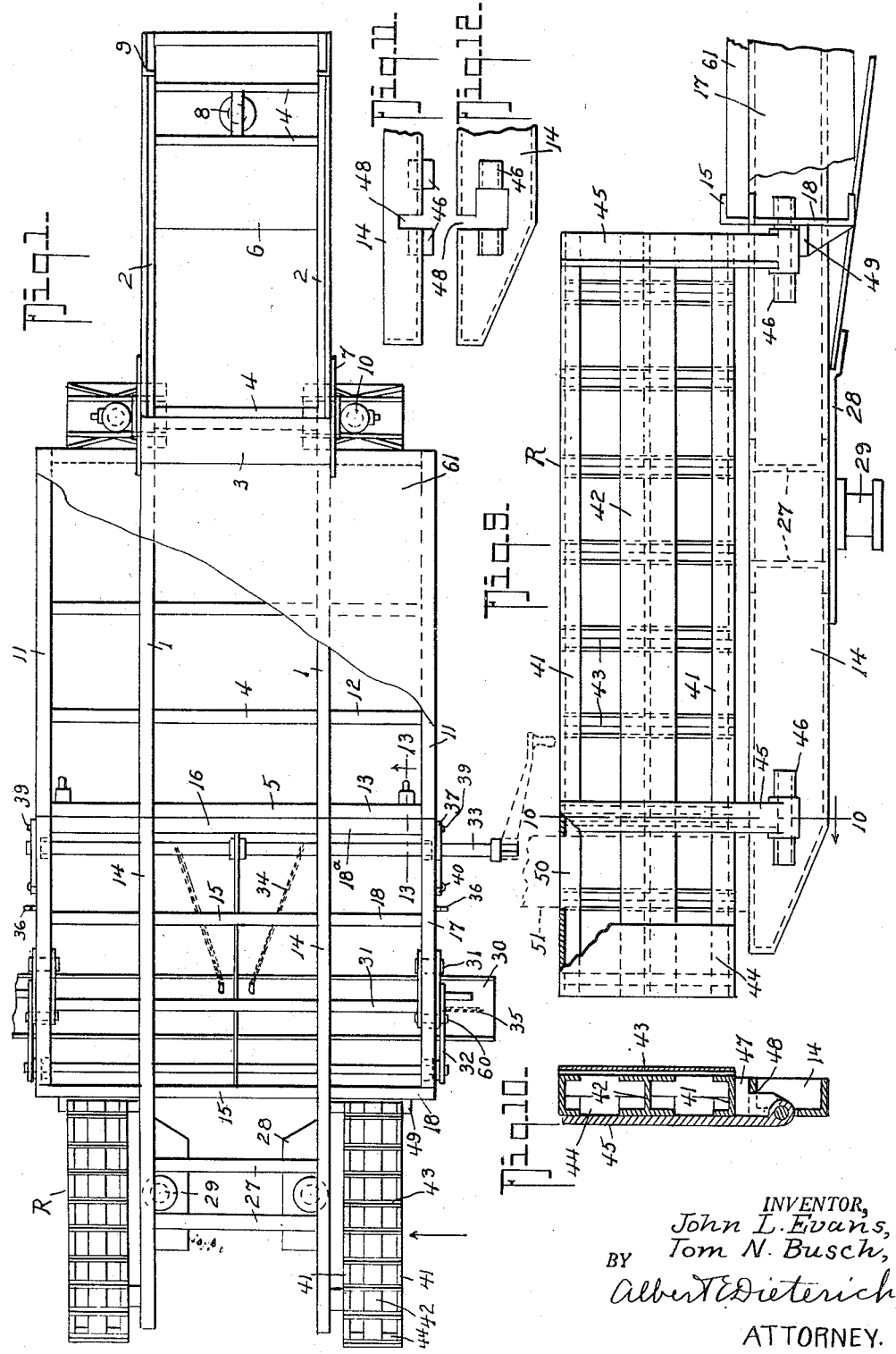

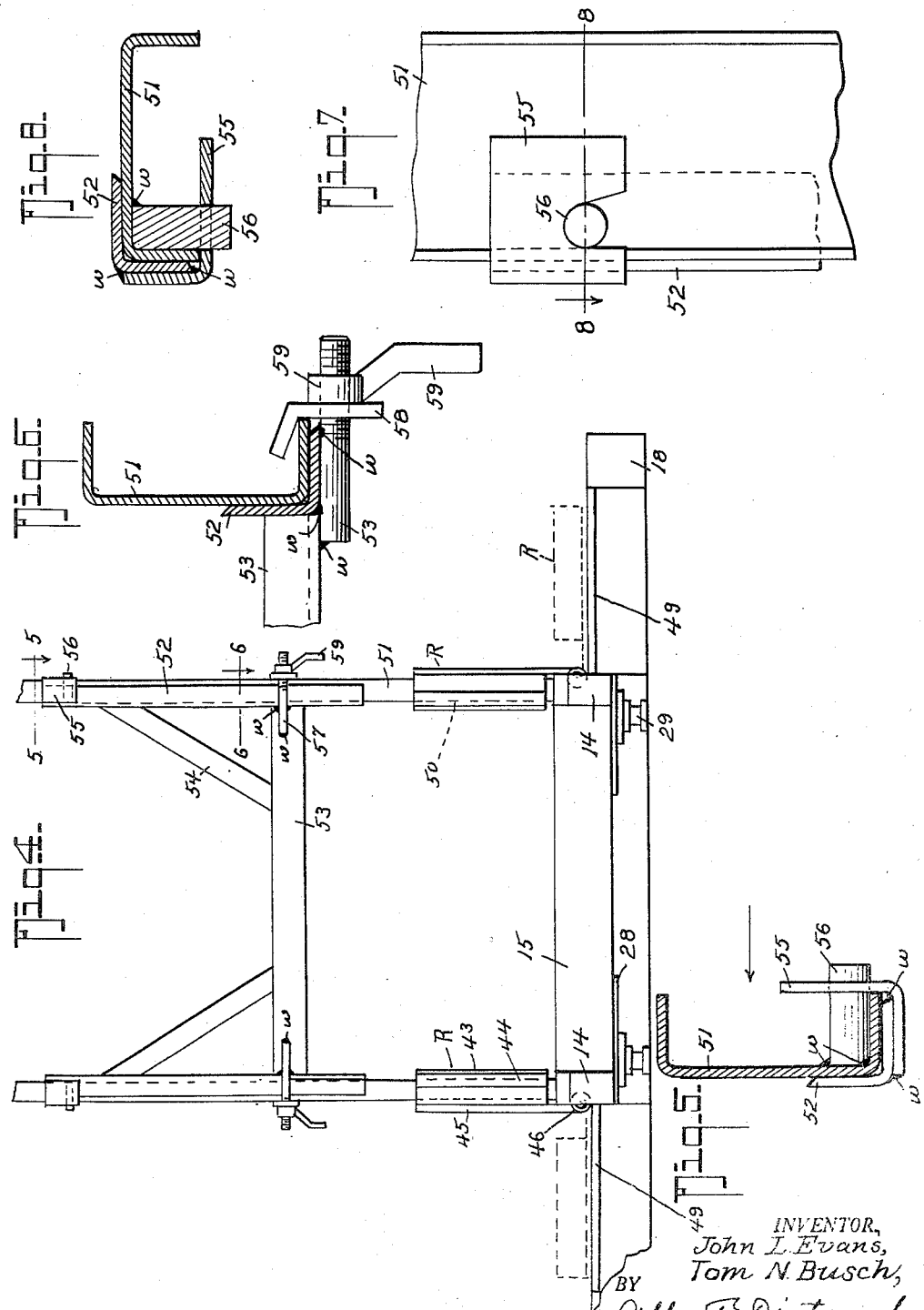

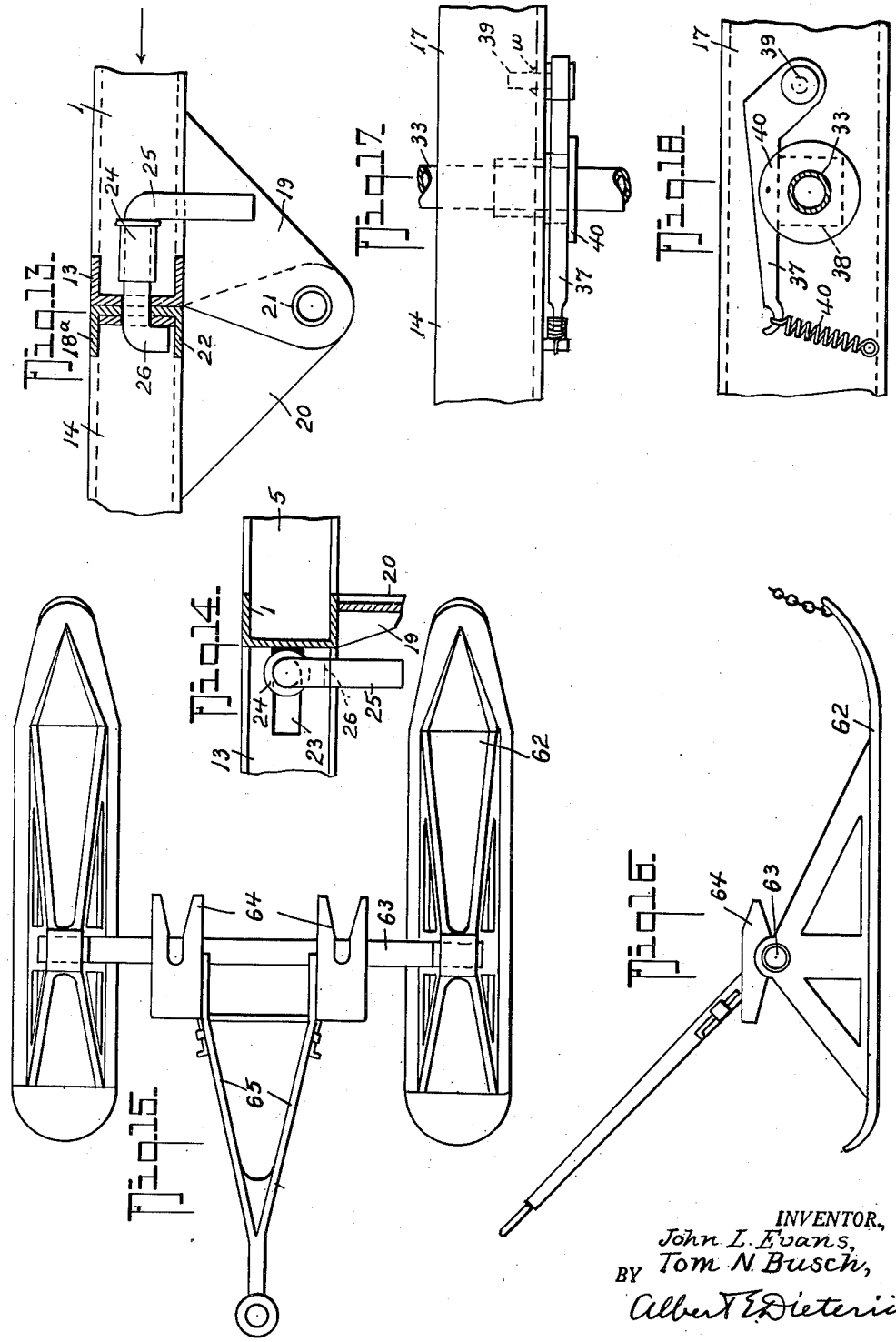

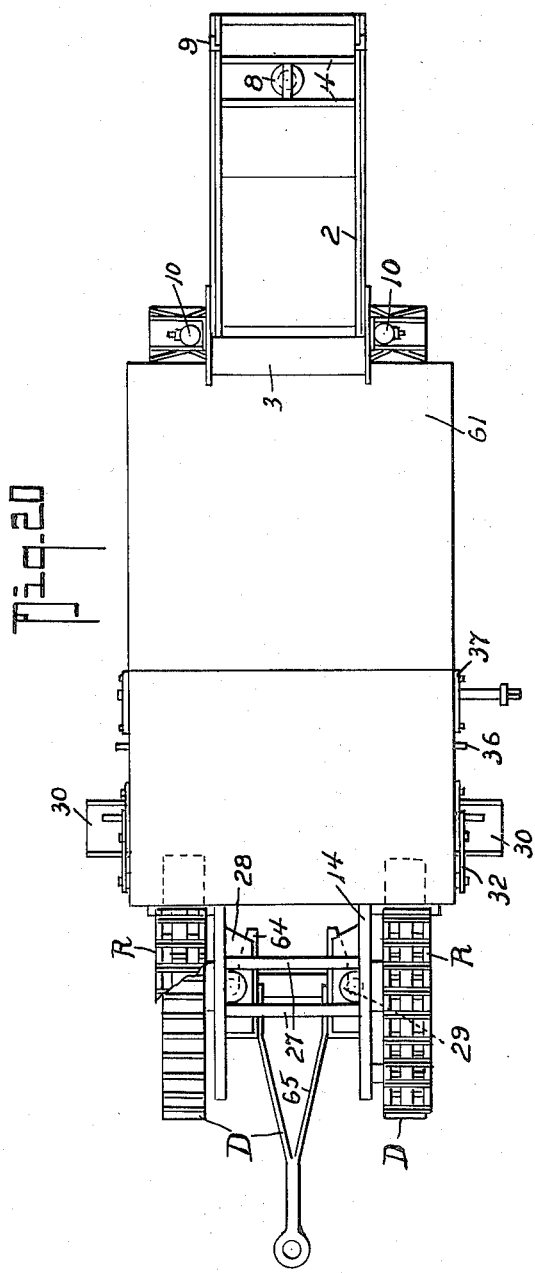

Patented Nov. 21, 1950

2,530,866

UNITED STATES PATENT OFFICE 2,530,866

TRANSPORTATION ASSEMBLY

John L. Evans, Sumter, and Tom N. Busch, Georgetown, S. C.

Application November 26, 1946, Serial No. 712,330

15 Claims. (Cl. 280—33)

The present invention is an improvement on the transportation assembly disclosed in the application of John L. Evans and Tom N. Busch, filed May 1, 1946, Serial No. 669,401, now Patent No. 2,466,938, granted April 12, 1949.

This invention has for an object to increase the utility of the above mentioned transportation assembly so that it may not only be useful for hauling logs and the like but also be useful for hauling machinery, such as tractors, traction engines, etc.

A further object is to provide an articulated frame so constructed that it can be arranged to act in part as a ramp upon which the tractor, etc. may climb under its own power and by its own weight automatically bring the frame to a normal or transportable position when the tractor, etc. shall have passed up the ramp a certain distance.

Other objects will in part be obvious and in part be pointed out hereinafter.

To the attainment of the aforesaid objects and ends invention further resides in the novel details of construction, combinations, and arrangements of parts all of which shall first be fully described hereinafter and then be specifically pointed out in the appended claims reference being had to the accompanying drawings in which:

Fig. 1 is a top plan view of the improved frame assembly.

Fig. 2 is a side elevation of the same.

Fig. 3 is a somewhat schematic side elevation showing the frame positioned to receive a tractor or similar structure.

Fig. 4 is a detail rear elevation of the rear end of the frame showing the rear standards in place.

Fig. 5 is an enlarged cross section on the line 5—5 of Fig. 4.

Fig. 6 is an enlarged cross section on the line 6—6 of Fig. 4.

Fig. 7 is a detail elevation looking in the direction of the arrow in Fig. 5.

Fig. 8 is a cross section on the line 8—8 of Fig. 7.

Fig. 9 is an enlarged side elevation of one of the foldable ramps.

Fig. 10 is a cross section on the line 10—10 of Fig. 9.

Fig. 11 is a detail plan view of the rear end of one longitudinal frame beam showing the cut-out for the hinge plate.

Fig. 12 is a side elevation of the same.

Fig. 13 is an enlarged detail section on the line 13—13 of Fig. 1.

Fig. 14 is an elevation of the same looking in the direction of the arrow in Fig. 13.

Fig. 15 is a top plan view of a ski-type detachable axle unit.

Fig. 16 is a side elevation of the same.

Fig. 17 is a detail plan view of the stiff leg winch brake.

Fig. 18 is a face view of the same the winch shaft being in section.

Fig. 19 is a detail edge plan view of the ramp shown in Fig. 9.

Fig. 20 is a top plan view of the improved frame assembly with the mobile unit coupled to the same.

In the drawings in which like numerals and letters of reference indicate like parts in all the figures, it will be seen that the frame is made in two parts hinged together. The fore part of the frame is composed of lower main longitudinal beams 1, elevated longitudinal beams 2, connecting beams 3, cross beams 4 and 5 and side plates 7. A bed plate 6 lies on the underside of the elevated portion of the front section of the frame and carries a center king pin 8 for coupling to a tractor T. The tractor may be of any approved construction, as for example a wheeled tractor, (see application Serial No. 669,401 aforesaid) a crawler-type tractor (Fig. 2). As the tractor per se is not of the present invention it has not been fully illustrated in the drawings.

Front standards 9 are secured to the front end of the frame as in the frame of application Serial No. 669,401 aforesaid.

A screw-type or other suitable landing gear 10 is secured to the front section of the frame as best shown in Figs. 2 and 3.

The lower portion of the front section of the frame has laterally extending beams 12 and 13 and side beams 11.

The rear section of the frame is composed of main longitudinal beams 14, cross beams 15 and 16, side longitudinal beams 17 and side or laterally extending cross beams 18, 18ª. The main longitudinal beams 14 extend rearwardly of the rear cross beams 15, 18 and are connected by other cross beams 27. Coupling-pin-carrying plates 28 are secured to the extension and to the beams 27 and have coupling pins 29 for the mobile axle unit D. The unit D may be of the well known crawler type, the two or four wheel type or the ski type. For purposes of illustration a unit D of the crawler type is shown in Fig. 2 and one of the ski type is shown in Figs. 15 and 16. The constructions of these units are well known and per se are not part of the present invention.

The two frame sections have their cross beams 5 and 18ª respectively adjacent each other and the sections are connected by hinge rod 21 in brackets 19 and 20 carried by the respective sections, thus forming a rule joint which can only break upwardly (see Figs. 2, 3, 13 and 14).

Locking devices hold the sections in longitudinal alignment when the frame is being transported. The locking devices each comprise a rotary latch 25, mounted in a bearing 24 welded to a longitudinal beam 1, having a hook portion 26 that may be passed through slots 23 in the beams 13 and 18a. The hook portion after being passed through the slots 23 and turned at right angles thereto over the reinforcing plate 22 will secure the beams 13, 18a together and prevent accidental breaking of the joint.

A stiff leg structure 30 is pivoted at 31 to the side bars 17 and when in use is secured in position by a latch device 32, pivoted at 31a and adapted to engage latch lugs 60 on the legs 30 (see Figs. 2 and 3). A winch 33 (Figs. 1, 2, 17, and 18) is provided for raising the stiff leg 30, being connected thereto by chains 34.

The stiff leg also has safety chains 35 at each side for hooking in the slots of safety hooks 36 welded to the beams 11.

The winch is provided with at least one drag block 37 for engagement by a drag brake 38 that is pivoted at 39 to the frame and is held against the block 37 by means of a spring 40.

To the extended beams 14 ramps are hingedly secured to fold down to the rear of the laterally extended portions of the frame 17, 18, 18a, in the planes thereof or be held vertically above said beams when transporting the frame. The ramps are composed of side longitudinal beams 41, a center longitudinal H-beam 42 and cross angles 43. The angles 43 lie on the side of the ramp which faces inwardly when folded up. Hinge bars 45 having wings 47 are at the other face of the ramp. At the rear of the under face of the ramp is a bevelled portion carrying a ground engaging plate 44 (see Fig. 9). The hinge bars 45 have pins held in pin bearings 46 welded to the beams 14 and the rear hinges have wings 47 held that enter slots 48 in the beams 14 and act as stops when the ramps are in vertical or raised position (see Fig. 10). Brackets 49 on rear beams 18 serve as stops for the ramps when they are in the down or horizontal position.

Each ramp has a pocket 50 to receive a rear standard (channel iron) 51. The two standards 51 are braced and connected together by a frame consisting of uprights (angle iron), 52, a cross bar 53, diagonal braces 54, hook members 55 and clamp devices. The clamp devices each comprise a threaded bolt welded to an angle 52 and cross brace 53 (as at w), a clamp plate 58 and a nut-lever 59 as best shown in Figs. 4 to 8 inclusive. The members 55 hook over studs 56 that are welded to the standards 51. The purpose of the parts 50 to 59 is to form an end stop that is vertically adjustable and removable and serves to hold the load from rolling off the end of the frame during transportation and also holds the ramps 45 in raised positions. When the ramps are in raised position logs can be loaded thereon as well as on the platform 61. When the apparatus is used for transporting motor vehicles, such as tractors, the raised ramps alone may act as stops to prevent the transported vehicle rolling off should its brakes be not set.

When the ramps are in vertical positions and the standards are in place the frame unit 52—59 is placed in position and the clamps tightened. This not only braces the rear standards but also serves to prevent the ramps falling down.

When it is desired to load a tractor, traction engine or other mobile unit onto the frame, the latches 25 are turned 90° from the position shown in Figs. 13 and 14 until the portion 26 lines up with the slots 23 and the portion 26 pulled through the slot in the member 14 by moving the part 25 from left to right in Fig. 13 and the sections of the frame are tilted as shown in Fig. 3, by backing the vehicle to tilt the leg structure 30, and the ramps are lowered (after removing the rear standards, etc.). The tractor is then run up the ramps onto the floor 61. As soon as the tractor has passed beyond the location of leg 30 its weight will rock the rear section on the leg 30 as a fulcrum and bring the hinge joint to closed position, pushing legs 10 forwardly as the joint goes down. As soon as the hinge joint is closed latches 25 are moved to secure the joint in that position, the ramps may then be swung up and the rear standards, etc. replaced.

When it is desired to transport the frame and its load from place to place a suitable tractor or towing vehicle T is coupled to pin 8, a suitable mobile unit D is coupled to pins 29 and legs 30 and 10 raised from the ground after which the trailer can be used to haul the loaded vehicle from place to place as desired.

On arriving at the desired location legs 10 and 30 are again lowered; the tractor T is uncoupled and moved to the rear where it is coupled to the mobile unit D. This unit is then uncoupled from the pins 29 and withdrawn by the tractor, leaving the frame sitting on its legs.

When used to carry logs or pulp wood and other nonmobile articles the hinge joint remains locked and the frame used in the same way as the frame in the above mentioned application is employed.

A mobile axle unit which may be used with the frame in snowy weather in place of a track type, if desired, is shown in Figs. 15 and 16 wherein skis 62 carry the axle 63 on which the coupling plate units 64 and the towing tongue 65 are mounted. The specific construction of this unit per se is not of the subject matter of this application and need not be further described. This unit's use in lieu of that indicated at D in Fig. 2 will be obvious.

The mobile unit D is wider than the rear extension of the frame so that the traction elements, tracks (tractor-type unit), wheels (wheeled-type unit), or skids (skid-type unit) extend to each side of the frame extension (narrow rear end) so that the traction elements will lie beneath the ramp R when the ramps are down (Fig. 20).

From the foregoing description taken in connection with the accompanying drawings it is thought that the construction, operation and uses of the invention will be clear to those skilled in the art.

What we claim is:

1. In a transportation assembly, a semi-trailer frame composed of a front section and a back section hinged together by a rule joint; means at the front part of the front section for coupling to a towing means; a mobile axle unit detachably coupled to and supporting the rear section of the frame when the mobile axle unit is coupled to the frame; a foldable stiff leg mounted on the rear section of the frame for supporting the same when the mobile axle unit is uncoupled and detached from the frame; a landing gear carried by the front section of the frame for supporting the same when the towing means is uncoupled; and means for holding the rule joint against breaking while the frame is in transit.

2. In a transportation assembly, a semi-trailer frame composed of a front section and a back section hinged together by a rule joint; means at the front part of the front section for coupling to a towing means; a mobile axle unit detachably coupled to and supporting the rear section of the frame when the mobile axle unit is coupled to the frame; a foldable stiff leg mounted on the rear section of the frame for supporting the same when the mobile axle unit is uncoupled and detached from the frame; a landing gear carried by the front section of the frame for supporting the same when the towing means is uncoupled; and means for holding the rule joint against breaking while the frame is in transit.

3. In a transportation assembly, a semi-trailer frame composed of a front section and a back section hinged together by a rule joint; means at the front part of the front section for coupling to a towing means; a mobile axle unit detachably coupled to and supporting the rear section of the frame when the mobile axle unit is coupled to the frame; a foldable stiff leg mounted on the rear section of the frame for supporting the same when the mobile axle unit is uncoupled and detached from the frame; a landing gear carried by the front section of the frame for supporting the same when the towing means is uncoupled; and means for holding the rule joint against breaking while the frame is in transit, said stiff leg being mounted on the back frame section intermediate its ends to serve as a fulcrum while the frame is being loaded and the back section is inclined as a ramp.

4. In a transportation assembly an improved frame composed of an articulated center section, a raised front end and a narrow rear end; a rule joint for the parts of the center section; a landing gear for the frame located forward of the rule joint, a foldable stiff leg for the frame between the rear end and the rear portion of the center section of the frame; a mobile axle unit detachably coupled to said rear end of the frame and extending laterally beyond the width of said rear end; ramps hinged to said rear end at the sides thereof and constructed to lie over the lateral extensions of said mobile axle unit when in one position and to lie above the frame when in another position.

5. In a transportation assembly an improved frame composed of an articulated center section, a raised front end and a narrow rear end; a rule joint for the parts of the center section; a landing gear for the frame located forward of the rule joint, a foldable stiff leg for the frame between the rear end and the rear portion of the center section of the frame; a mobile axle unit detachably coupled to said rear end of the frame and extending laterally beyond the width of said rear end; ramps hinged to said rear end at the sides thereof and constructed to lie over the lateral extensions of said mobile axle unit when in one position and to lie above the frame when in another position, and rear standards detachably mounted on said ramps to extend vertically when the ramps lie above the frame; and means to tie said standards together to hold said ramps in parallel vertical positions.

6. In apparatus of the class described a frame composed of longitudinal and transverse beams constituting a longitudinal frame and two laterally projecting sub-frames; said longitudinal beams being articulated and joined in a transverse plane by a rule joint adapted to break upwardly, the longitudinal frame extending both forwardly and rearwardly of the sub-frames; a king pin on the forwardly extending portion of the longitudinal frame for coupling to a tractor and a pair of transversely aligned king pins on the rearwardly extending portion of the longitudinal frame for coupling to a mobile axle unit; a landing gear for the frame mounted adjacent the front of the frame; a foldable stiff leg mounted on the frame between its rear extension and said rule joint in virtue of all of which the rear end of the rear extension may be tilted to the ground on said stiff leg as a fulcrum and the rule joint broken upwardly; and foldable ramps mounted on the sides of said rear extension and adapted to be swung down to the plane of the frame; and a floor on the frame, by virtue of all of which a tractor may be driven up the ramps and when past the fulcrum point of said stiff legs, by its own weight lower the rule joint and close the same; and means for latching the rule joint against accidental breaking.

7. In apparatus of the class described wherein a mobile axle unit and a towing mechanism are employed; the improvement which includes an articulated frame of two sections, a front section and a rear section connected by a hinge joint with means for restricting the joint to break normally upwardly; a releasable means securing the hinge joint against breaking; means by which the towing mechanism may be detachably connected to and support the front section of the frame; means by which the mobile axle unit may be detachably connected to and support the rear section of the frame; a landing gear for said front section; and a foldable stiff leg for said rear section said landing gear and said leg serving to support the frame when the mobile axle unit and the towing mechanism are detached from the frame.

8. In apparatus of the class described wherein a mobile axle unit and a towing mechanism are employed; the improvement which includes an articulated frame of two sections, a front section and a rear section connected by a hinge joint with means for restricting the joint to break normally upwardly; releasable means securing the hinge joint against breaking; means by which the towing mechanism may be detachably connected to and support the front section of the frame; means by which the mobile axle unit may be detachably connected to and support the rear section of the frame; a landing gear for said front section; and a foldable stiff leg for said rear section said landing gear and said leg serving to support the frame when the mobile axle unit and the towing mechanism are detached from the frame, and ramps hinged to said rear section of the frame at the sides thereof; means to hold said ramps in the horizontal plane of the frame or in planes normal thereto as desired.

9. In apparatus of the class described wherein a mobile axle unit and a towing mechanism are employed; the improvement which includes an articulated frame of two sections, a front section and a rear section connected by a hinge joint with means for restricting the joint to break normally upwardly; releasable means securing the hinge joint against breaking; means by which the towing mechanism may be detachably connected to and support the front section of the frame; means by which the mobile axle unit may be detachably connected to and support the rear section of the frame; a landing gear for said front section; and a foldable stiff leg for said rear section said landing gear and said leg serving to support the frame when the mobile axle unit and the towing mechanism are detached from the frame; and means for latching said stiff leg in a frame-supporting position when desired.

10. In apparatus of the class described wherein a mobile axle unit and a towing mechanism are employed; the improvement which includes an articulated frame of two sections, a front section and a rear section connected by a hinge joint with means for restricting the joint to break normally upwardly; releasable means securing the hinge joint against breaking; means by which the towing mechanism may be detachably connected to and support the front section of the frame; means by which the mobile axle unit may be detachably connected to and support the rear section of the frame; a landing gear for said front section; and a foldable stiff leg for said rear section said landing gear and said leg serving to support the frame when the mobile axle unit and the towing mechanism are detached from the frame; and means for raising and securing said stiff leg in its inoperative position when desired.

11. In a frame of the character described wherein there is a wide mid portion and a narrow rear extension with provisions for coupling to a mobile axle unit of greater width than that of the rear extension: the improvement which comprises ramps hinged to the sides of the narrow rear extension to fold down in the plane of the wide mid portion of the frame and thereby constitute a lateral extension of the narrow rear extension and a longitudinal extension of the wide mid-portion or fold up above the sides of the narrow extension as desired; means to support the ramps in their down position; and means to secure the ramps in their up position when desired.

12. In a frame of the character described wherein there is a wide mid portion and a narrow rear extension with provisions for coupling to a mobile axle unit of greater width than that of the rear extension: the improvement which comprises ramps hinged to the sides of the narrow rear extension to fold down in the plane of the wide mid portion of the frame and thereby constitute a longitudinal extension of the same, or fold up above the sides of the narrow extension as desired; means to support the ramps in their down position; and means to secure the ramps in their up position when desired, said last named means comprising pockets in the ramps, standards set in said pockets and a connecting brace frame between opposite standards.

13. In a frame of the character described wherein there is a wide mid portion and a narrow rear extension with provisions for coupling to a mobile axle unit of greater width than that of the rear extension: the improvement which comprises ramps hinged to the sides of the narrow rear extension to fold down in the plane of the wide mid portion of the frame and thereby constitute a longitudinal extension of the same, or fold up above the sides of the narrow extension as desired; means to support the ramps in their down position; and means to secure the ramps in their up position when desired, said last named means comprising pockets in the ramps, standards set in said pockets and a connecting brace frame between opposite standards, said brace frame having means for detachably securing it to said standards.

14. In a frame of the character described wherein there is a wide mid portion and a narrow rear extension with provisions for coupling to a mobile axle unit of greater width than that of the rear extension: the improvement which comprises ramps hinged to the sides of the narrow rear extension to fold down in the plane of the wide mid portion of the frame and thereby constitute a longitudinal extension of the same, or fold up above the sides of the narrow extension as desired; means to support the ramps in their down position; and means to secure the ramps in their up position when desired, said wide mid portion of the frame having a floor and being formed in two parts with a transverse rule joint connecting the same; a landing gear for supporting the fore part of the frame and a hinged stiff leg for supporting the aft part of the frame in advance of the ramps, the rule joint breaking upwardly, by virtue of all of which, with the ramps down and the rear end of the frame in contact with the ground a traction engine may be run up the ramps onto the frame floor and on passing the position of the stiff legs, cause the frame parts to rock together and close the rule joint.

15. In a frame of the character described wherein there is a wide mid portion and a narrow rear extension with provisions for coupling to a mobile axle unit of greater width than that of the rear extension: the improvement which comprises ramps hinged to the sides of the narrow rear extension to fold down in the plane of the wide mid portion of the frame and thereby constitute a longitudinal extension of the same, or fold up above the sides of the narrow extension as desired; means to support the ramps in their down position; and means to secure the ramps in their up position when desired, said wide mid portion of the frame having a floor and being formed in two parts with a transverse rule joint connecting the same; a landing gear for supporting the fore part of the frame and a hinged stiff leg for supporting the aft part of the frame in advance of the ramps, the rule joint breaking upwardly, by virtue of all of which, with the ramps down and the rear end of the frame in contact with the ground a traction engine may be run up the ramps onto the frame floor and on passing the position of the stiff legs, cause the frame parts to rock together and close the rule joint, and means to secure the rule joint against accidentally breaking.

JOHN L. EVANS.
TOM N. BUSCH.

REFERENCES CITED

The following references are of record in the file of this patent:

UNITED STATES PATENTS

| Number | Name | Date |
| --- | --- | --- |
| 76,856 | Warren et al. | Apr. 14, 1868 |
| 1,123,249 | Costello | Jan. 5, 1915 |
| 1,924,797 | Mitchell | Aug. 29, 1933 |
| 2,015,879 | Twente | Oct. 1, 1935 |
| 2,131,949 | Helmig | Oct. 4, 1938 |
| 2,173,277 | Jarmin et al. | Sept. 19, 1939 |
| 2,350,841 | Troche et al. | June 6, 1944 |
| 2,417,619 | Seyferth | Mar. 18, 1947 |

FOREIGN PATENTS

| Number | Country | Date |
| --- | --- | --- |
| 632,039 | Germany | July 1, 1936 |